United States Patent [19]
Claxton

[11] Patent Number: 5,901,293
[45] Date of Patent: May 4, 1999

[54] BUS INTERFACE CONTROLLER FOR SERIALLY-ACCESSED VARIABLE-ACCESS-TIME MEMORY DEVICE

[76] Inventor: Daniel Dean Claxton, 5070 Pericarp Ct., San Diego, Calif. 92121

[21] Appl. No.: 08/669,942

[22] Filed: Jun. 25, 1996

[51] Int. Cl.⁶ ...................................................... H01J 13/00
[52] U.S. Cl. .......................... 395/287; 395/292; 395/309; 395/859; 711/150
[58] Field of Search ..................................... 395/284, 285, 395/287, 292, 298, 305, 309, 431, 432, 433, 440, 477, 480, 800, 559, 556, 856–859; 711/167–169

[56] References Cited

U.S. PATENT DOCUMENTS

| | | |
|---|---|---|
| 4,395,758 | 7/1983 | Helenius et al. . |
| 5,042,002 | 8/1991 | Zink et al. . |
| 5,276,858 | 1/1994 | Oak et al. ................................. 395/550 |
| 5,390,332 | 2/1995 | Golson . |
| 5,471,625 | 11/1995 | Mussermann et al. . |
| 5,493,664 | 2/1996 | Doi .......................................... 395/427 |
| 5,513,327 | 4/1996 | Farmwald et al. ....................... 395/309 |
| 5,515,521 | 5/1996 | Whitted, III et al. . |
| 5,561,821 | 10/1996 | Gephardt et al. ....................... 395/848 |
| 5,585,742 | 12/1996 | Kamiya . |
| 5,598,575 | 1/1997 | Dent et al. ............................... 395/800 |
| 5,627,480 | 5/1997 | Young et al. . |
| 5,630,085 | 5/1997 | Watanabe . |

*Primary Examiner*—Ayaz R. Sheikh
*Assistant Examiner*—Raymond N. Phan
*Attorney, Agent, or Firm*—David N. Lathrop

[57] ABSTRACT

A method and controller circuitry for coupling a variable access time serial memory device to a microprocessor is disclosed. The controller circuitry includes an input for receiving address signal lines and control signal lines generated by the microprocessor, control signal lines generated by the device, and control signal lines and data signal lines for sending signals to the microprocessor and to the device. The controller circuitry further includes a decoder, responsive to the received address signal lines and control signal lines, for determining if the device can immediately respond to the microprocessor-generated request. If the device can respond to the request immediately the controller circuitry signals the device to respond to the request; otherwise, the controller circuitry responds to the request, and sends signals to the device to prepare the device to respond to future microprocessor-generated requests. The controller circuitry further includes memory to allow it to alter its responses to the microprocessor and its signals to the device dependent upon prior signals it has sent and received.

20 Claims, 5 Drawing Sheets

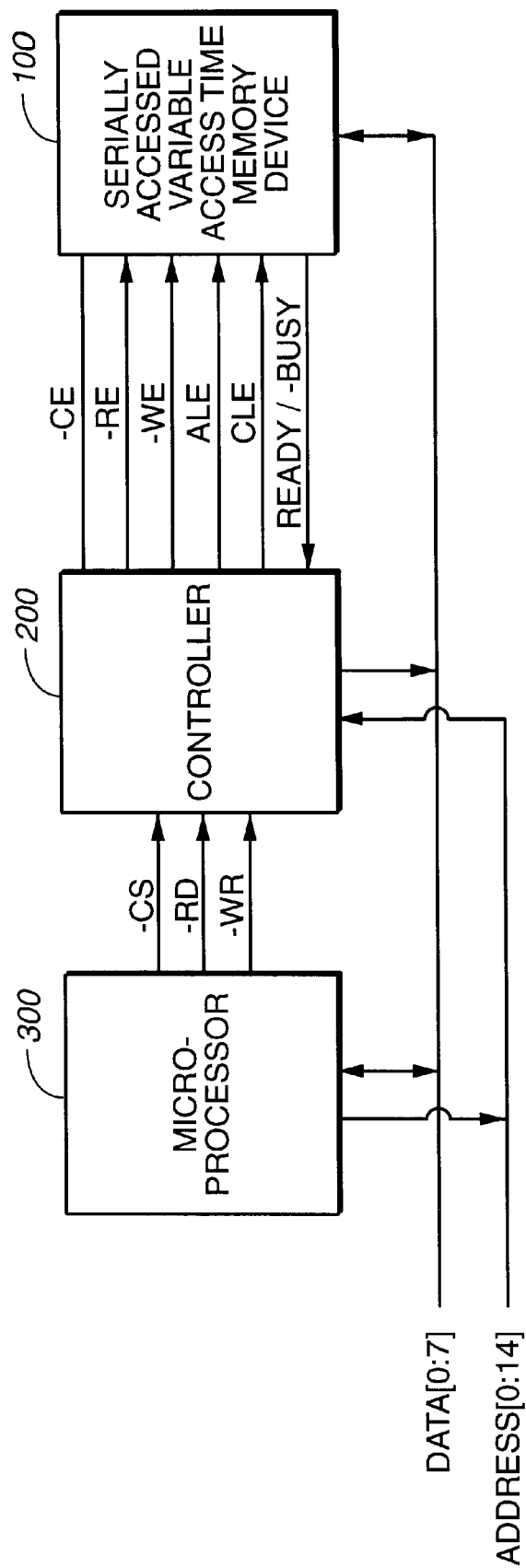
FIG._1

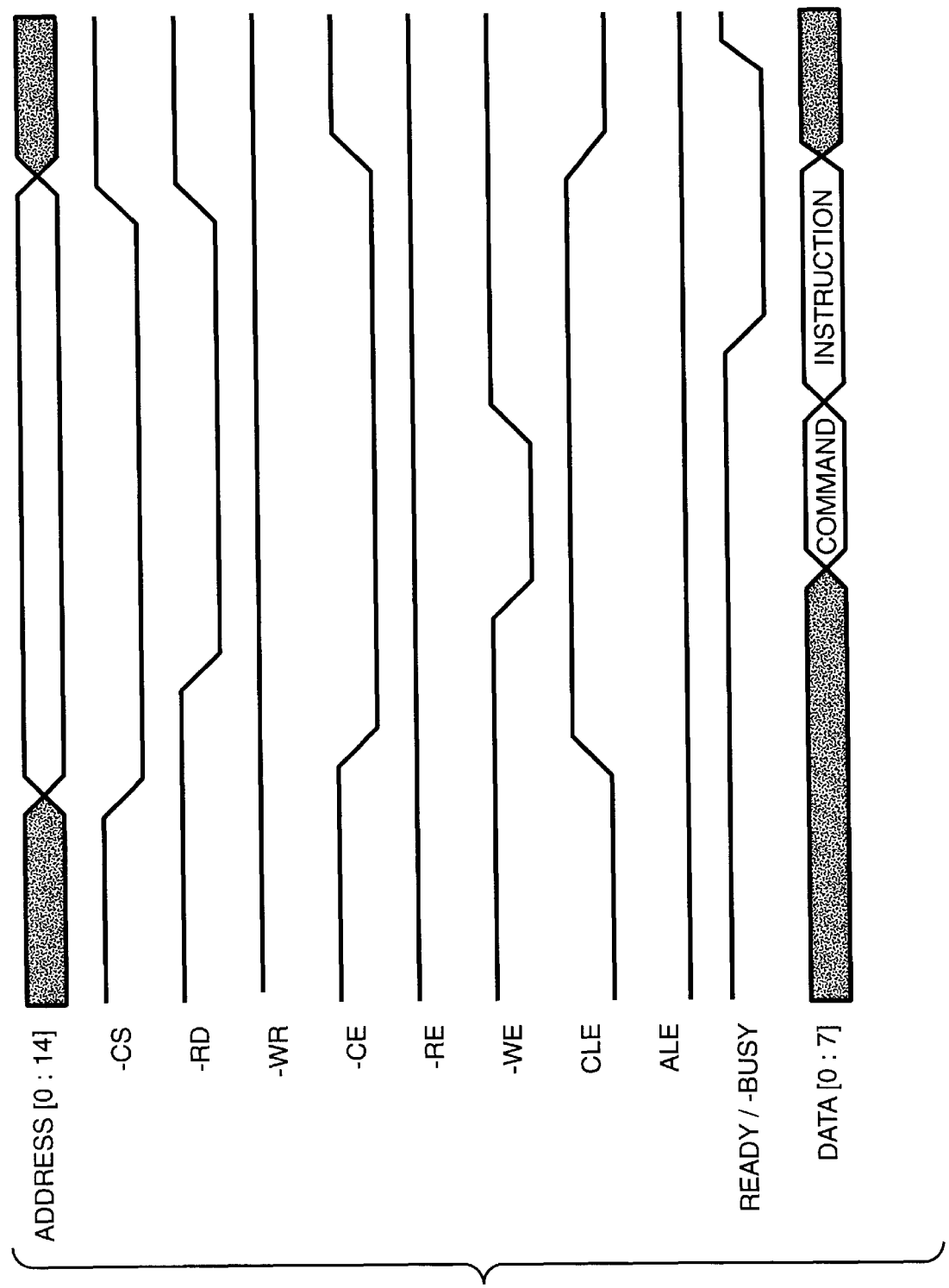
FIG._2

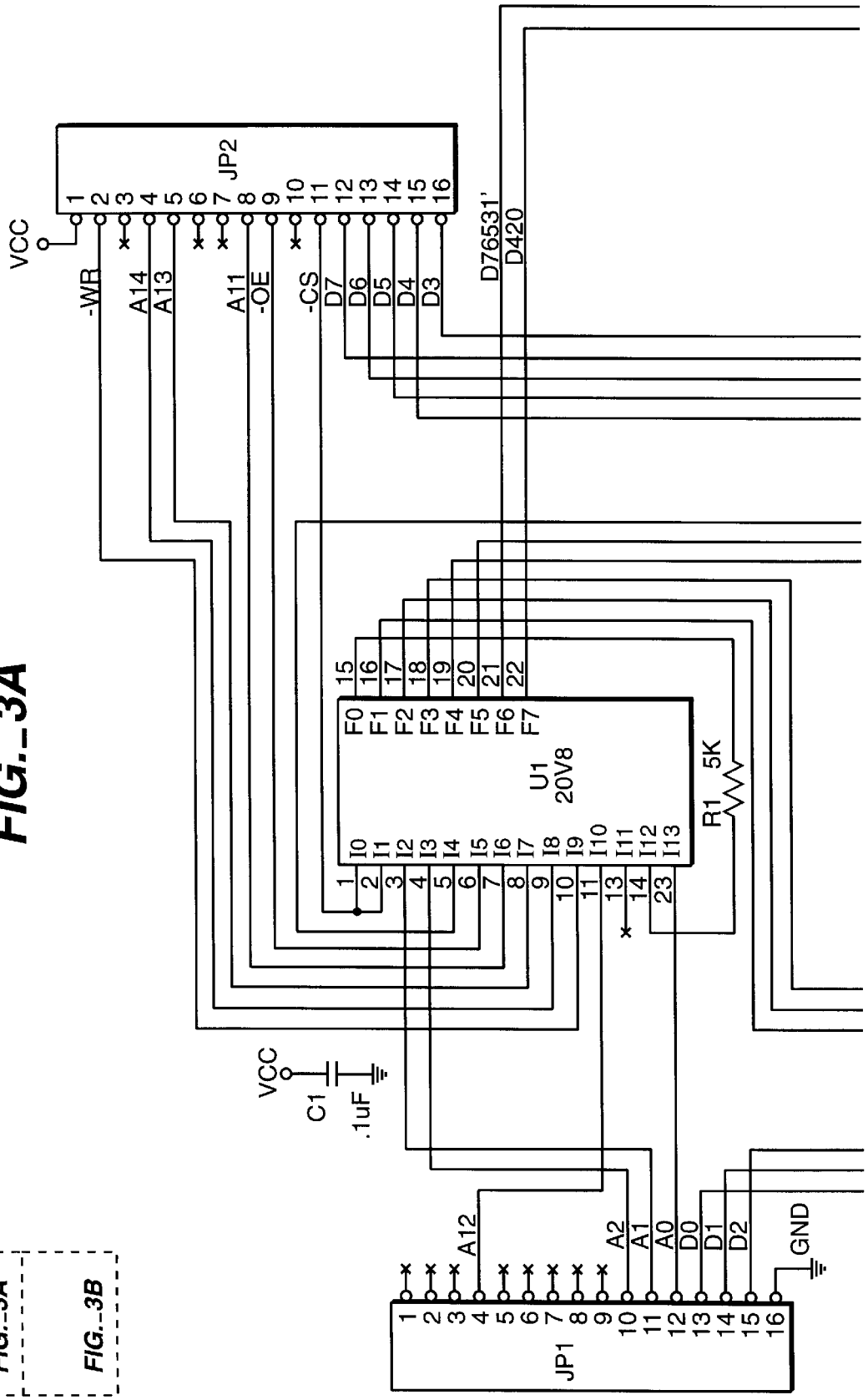
FIG._3A

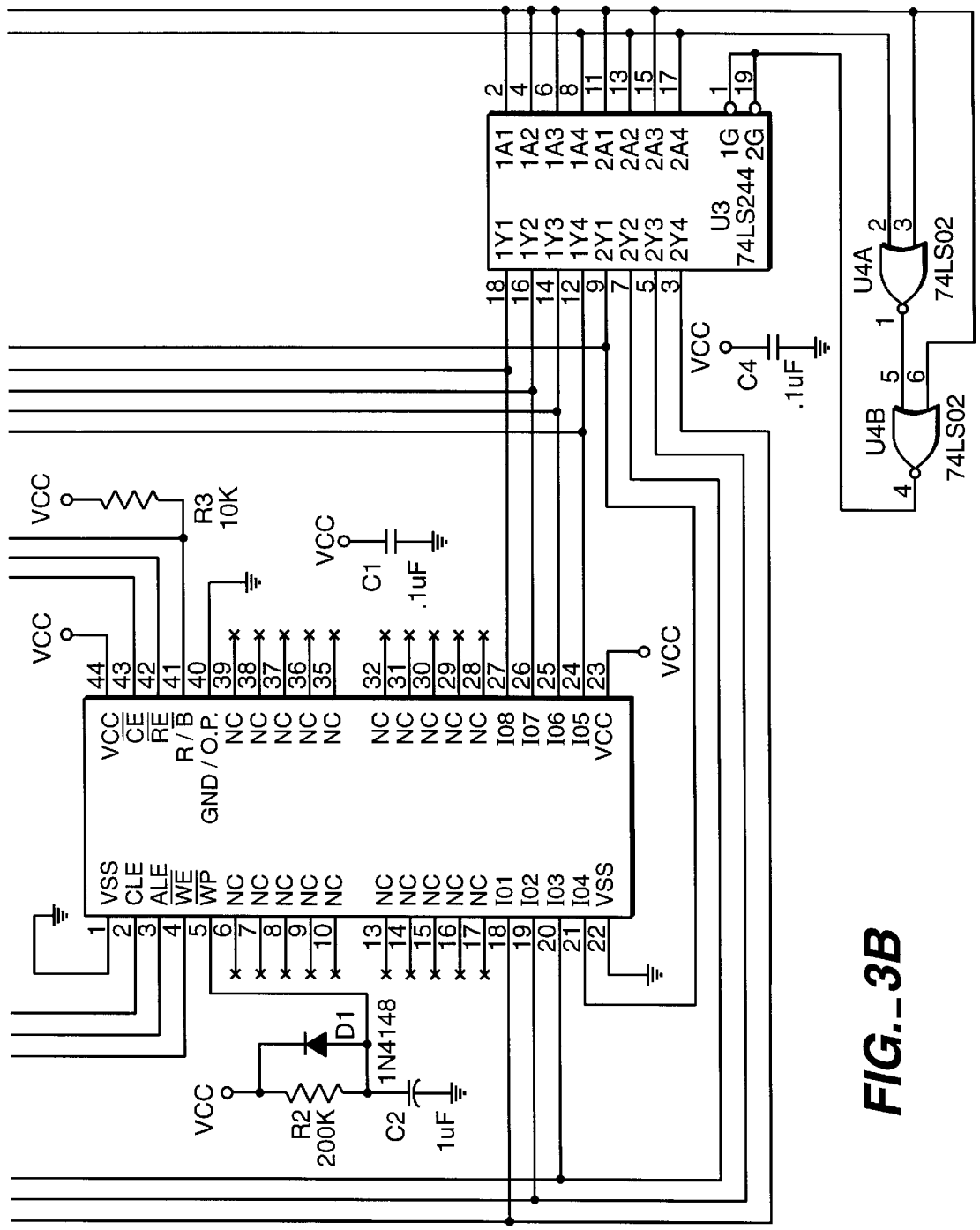
FIG._3B

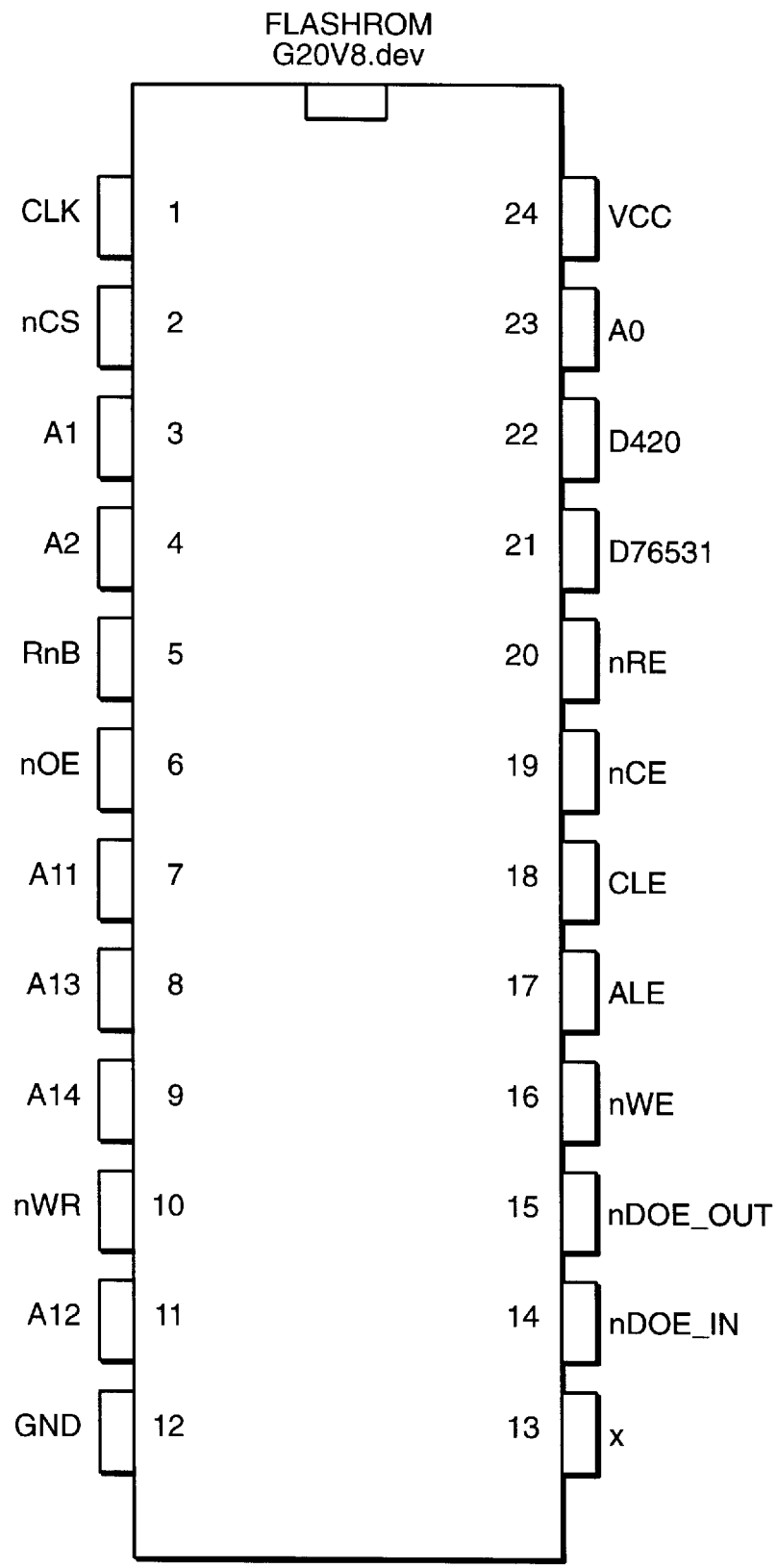
FIG._4

BUS INTERFACE CONTROLLER FOR SERIALLY-ACCESSED VARIABLE-ACCESS-TIME MEMORY DEVICE

TECHNICAL FIELD

The invention relates in general to a method for devices to communicate with a microprocessor device. More particularly, the invention relates to a method and apparatus which allows a microprocessor device to use a variable access time serially accessed memory device, or network device, to provide it with instructions for execution.

BACKGROUND

Most computers available today employ an architecture in which their instructions are stored in memory. A processor fetches each instruction from a memory location at an address which is stored in a register which is incremented after each fetch cycle. Some instructions often referred to as "jump" instructions alter the contents of this address register and thereby cause the next instruction to be fetched from the new address. When power is first applied instructions are fetched beginning at a fixed address known as the "reset vector." Non-volatile memory is commonly used to store program code for use when power is turned on. For a device to be suitable for this purpose it must be capable of decoding an address input and responding with the selected memory contents within the time constraints of the processor. A desirable feature of a non-volatile memory device is its ability to be erased and re-programmed within the system in which it resides.

Many non-volatile memory devices have been developed to serve as program code storage for use when power is turned on. As computer systems have become more complex the demand for faster, more compact and higher capacity non-volatile memory devices has increased. Typically as the capacities of the devices has increased the numbers of pins on the device packages has increased to accomodate the additional addressing requirement.

More recently non-volatile memory devices have been introduced which have high density, a reduced number of pins, and are electrically erasable and re-programmable; however, in order to function with fewer pins these devices use internal address registers, and the address and data inputs share a set of pins. To use these devices the system must issue command and address inputs to the device, wait for the device to signal that it is "ready", and then write or read the memory contents serially in small blocks. A memory element cannot be accessed randomly in a single bus cycle. The reduced pin count and greater density makes these devices less expensive to manufacture than random access non-volatile memory devices with the same capacity. The variable nature of the amount of time required to access the device as well as the device's requirement of receiving initialization commands has caused it to be considered unsuitable for program code storage for use directly by a microprocessor.

OBJECTS AND ADVANTAGES

Serial access memory devices offer the advantages of higher density, and fewer signal pins, than random access memory; however, they have the disadvantages of requiring initialization commands prior to initial and non-sequential access, and longer access times when accesses cross page boundaries. A network connection can be viewed as a type of serial memory device. Accordingly, it is an object of the present invention to provide a method for using serial access memory devices in applications which have previously been limited to random access memory devices.

It is an object of the present invention to provide a method which allows a microprocessor-like device to use a serially accessed memory device which requires command and/or address inputs, to store initial program code and to allow a serially accessed memory device to respond to a microprocessor-like device's instruction fetch bus cycles when power is turned on.

It is another object of the present invention to provide a method for coupling a microprocessor-like device with a device which cannot always respond to a microprocessor-like device within a single bus cycle.

It is another object of the present invention to provide a method for devices to communicate over a common bus controlled by a microprocessor-like device.

Further details of the above objects and still other objects of the present invention are set forth throughout this document, particularly in the Detailed Description of the Invention, below.

BRIEF DESCRIPTION OF DRAWINGS

FIG. 1 is a functional block diagram illustrating the basic functional structure of one embodiment of a system with a controlled serially accessed variable access time memory device according to the present invention.

FIG. 2 is a timing diagram illustrating the sequence of signals which occur during communication between a microprocessor, a controller, and a serial memory device during a microprocessor's instruction fetch bus cycle in one embodiment of a system according to the present invention.

FIG. 3(A–B) is a schematic electrical diagram showing in detail a practical example of a controller coupled to a serially accessed variable access time memory device according to the present invention.

FIG. 4 is a schematic graphical representation of a programmable logic device for use in the electrical circuit illustrated in FIG. 3 that is programmed according to a compiled source code listing of equations shown in an Appendix.

DETAILED DESCRIPTION OF THE INVENTION

FIG. 1 shows the basic functional structure of one embodiment of the present invention. According to this embodiment, as shown in FIG. 1, a Serially Accessed/Variable Access Time Memory Device 100 is electrically coupled to a Controller 200 and to a Microprocessor 300. A Controller 200 is also electrically coupled to a Microprocessor 300. The Controller 200 receives signals Address ADDRESS[0:14], Chip Select, -CS, Read -RD, and Write -WR generated by the Microprocessor 300. In response to the signals generated by the Microprocessor 300, and the Ready signal READY/-BUSY generated by the Serially Accessed/Variable Access Time Memory Device 100, the Controller 200 generates signals Chip Enable -CE, Read Enable -RE, Write Enable -WE, Address Latch Enable ALE, Command Latch Enable CLE, and Data DATA[0:7].

FIG. 2 shows the relative timings of signal waveforms generated by a controller, such as the Controller 200 of FIG. 1, in one embodiment of the present invention. In response to the Chip Select signal -CS going low and the Address signals ADDRESS[0:14] indicating an address which requires that a command be sent to a controlled device, the controller sets the Command Latch Enable CLE signal high, and the Chip Enable -CE signal low. When the microprocessor drives the Read -RD signal low signaling for the selected and addressed device to drive the requested data onto the data bus the controller instead drives a command for a controlled device onto the data bus, and then drives the Write Enable -WE signal low for a length of time required by the controlled device and then raises it high again signalling the controlled device to latch the command which the controller has driven onto the data bus. Next, the controller drives the next instruction of a "holding pattern" onto the data bus and waits for the microprocessor to raise the Read -RD signal high again indicating that it has latched the instruction. The "holding pattern" is a sequence of elements of an instruction which will cause the microprocessor to fetch again from the address of the first element of the holding pattern, also described as an instruction which jumps to itself. The operation of a Ready READY/-BUSY signal has been shown to illustrate a possible signal from a controlled device indicating that the command has been accepted and has caused the controlled device to become "not ready" for a period of time. When the Read -RD signal goes high the controller stops driving current onto the data bus.

Table I below illustrates a controller's actions in response to a microprocessor's instruction fetch bus cycles in one embodiment of a system according to the present invention. According to this embodiment a controller's response to the microprocessor's instruction fetch bus cycle is determined by the address inputs, the controller's state register, and the controlled device's "ready" signal. The microprocessor's instruction fetch bus cycles are used to generate clock signals to drive the state machine. In this example the microprocessor's fetch from the "reset vector" address represented by the hexadecimal number FFFF0000 causes the controller to return the hexadecimal number "EA", the operation code byte of a JUMP instruction to the microprocessor, and to initialize its state register to state 2. This action does not depend upon the prior contents of the state register. The microprocessor's subsequent fetches from addresses FFFF0001 through FFFF0003 cause the controller to return the JUMP instruction's operand bytes of the three least significant bytes of the address to which the microprocessor is being instructed to jump. The microprocessor's fetch from address FFFF0004 causes the controller to issue a reset command to the controlled device, then return the most significant address byte as the fourth operand byte of the JUMP instruction to the microprocessor, then the controller sets its state register to state 3.

The microprocessor's fetches from addresses FF000000 through FF000004 while the controller's state register contains state 3 cause the controller to return the "Holding Pattern" which is the operation code byte for a JUMP instruction and the four address operand bytes which will cause the microprocessor to continue fetching from these same five addresses. During the fetch from address FF000004 with the controller's state register in state 3, if the Ready READY/-BUSY input signal is high then the state register is changed to state 2.

The microprocessor's fetches from addresses FF000000 through FF000004, with the controller's state register in state 2, cause the controller to return the Holding Pattern; and in addition, during the fetch from address FF000002 the controller issues a READ command to the controlled device, and also during the fetch from address FF000004 the state register is changed to state 4.

The microprocessor's fetches from addresses FF000000 through FF000004 with the controller's state register in state 4 cause the controller to return the Holding Pattern. In addition, during each of these fetches from addresses FF000001, FF000002, and FF000003 the controller issues an address byte to the controlled device as an operand to the previous READ command. Also during the fetch from address FF000004 the state register is changed to state 0.

The microprocessor's fetches from addresses FF000000 through FF000004 with the controller's state register in state 0 cause the controller to return the Holding Pattern; however, during the fetch from address FF000004 in state 0, if the Ready READY/-BUSY signal is high the fourth address operand byte returned is EA rather than FF. This causes the microprocessor to fetch the next instruction from the new address EA000000.

FIG. 3 is a schematic electrical diagram showing in detail a practical example of a controller coupled to a serially accessed variable access time memory device according to the present invention. In this example a Programmable Logic Device U1, 20V8 is used to decode bus signals received from pins on connectors JP1 and JP2. The pin arrangement on connectors JP1 and JP2 corresponds to the arrangements of pins on industry standard 32 pin EEPROM devices. This design has the advantage that it can be implemented as a pin-compatible replacement for an industry standard EEPROM device, with additional storage capacity. U1 controls the serially accessed/variable access time memory device U2, TC5816 manufactured by Toshiba Corporation. Octal Line Driver with 3-state outputs U3, 74LS244 which is used by U1 to drive current on the data bus. U4A and U4B, 74LS02 "NOR" gates are used to decode signals from U1 to provide output enable signals for U3. Capacitors C1, C3, and C4 provide power and ground decoupling for the other devices. Capacitor C2, Resistor R2 and Diode D1 provide a Write Protect signal for U2 which is delayed after power is applied. Resistor R1 generates a delay which is used by U1 to determine the duration of the Write Enable -WE signal. Resistor R3 pulls up the open-collector signal Ready/Busy READY/-BUSY.

FIG. 4 is a schematic graphical representation of Programmable Logic Device U1. An Appendix contains a source code listing of equations used to program the Programmable Logic Device U1, 20V8 specified for use in the electrical circuit illustrated in FIG. 4. In this example the Chip Select -CS input signal is used to clock the state machine registers. The state machine registers' outputs directly control the memory device's Chip Enable -CE, Address Latch Enable ALE, and Command Latch Enable CLE signals. This example has the features of providing functions which allow a microprocessor to set and clear the flip-flops which provide the memory device's Chip Enable -CE, Address Latch Enable ALE, and Command Latch Enable CLE signals. This example has the additional feature of providing a function which allows a microprocessor to read the state of the memory device's Ready/Busy READY/-BUSY signal.

In accordance with the teachings of the present invention, in one embodiment, in response to a microprocessor's instruction fetch bus cycles in a selected range of addresses a controller issues initialization commands to a serially accessed/variable access time memory device ("memory device") while at the same time satisfying a microprocessor's instruction fetch requests with instruction codes which will cause the microprocessor to continue fetching from a selected range of addresses ("holding pattern") which are controlled by the controller. When the memory device signals the controller that it is ready to respond with its stored program code the controller signals the memory device to deliver its data in response to the microprocessor's instruction fetch requests. This allows the memory device to deliver initial instructions to a microprocessor which cause the microprocessor to transfer a second set of instructions from the memory device to a volatile memory which is also coupled to the microprocessor. The initial instructions further cause the microprocessor to begin fetching instructions from the second set of instructions stored in volatile memory. The instructions in the second set cause the microprocessor to transfer additional portions of the operating system from the memory device into volatile memory and then begin fetching instructions from these additional portions of the operating system stored in the volatile memory.

In accordance with the teachings of the present invention, in a preferred embodiment, a controller maintains a state register and an address register which indicate the state and address of the next available memory cell of a serially accessed memory device. When the controller determines the memory device is not ready, or the microprocessor requests an address which is out of sequence, the controller responds to the microprocessor's request with instructions which cause the microprocessor to continue fetching instructions from a limited range of addresses which periodically includes the new address. The microprocessor's fetch cycles are used as clock signals to drive the state machine. While the microprocessor is busy fetching the controller's "holding pattern" the controller issues commands to the serially accessed memory device to enable it to respond to fetches beginning at the new address. When the serially accessed memory device signals the controller that it is ready to respond to the microprocessor's request at the new address the controller allows it to do so on the next iteration of fetches which begins at the new address.

Also in accordance with the teachings of the present invention, in a preferred embodiment, a controller sends initialization commands to a controlled device during a first portion of the microprocessor's instruction fetch bus cycle, and sends instructions to the microprocessor during a second portion of the microprocessor's instruction fetch bus cycle. During the first portion of the microprocessor's instruction fetch bus cycle the microprocessor signals for the controlled device to drive the requested data onto the data bus. At this time the controller drives a command onto the data bus and signals the controlled device to accept the command. The controller then drives the next instruction of its holding pattern onto the data bus and the microprocessor accepts this data and completes the cycle. An alternative method makes use of a microprocessor's "ready" signal which the controller can use to control the length of a bus cycle.

III. ALTERNATIVE IMPLEMENTATIONS OF THE INVENTION

The controller's ability to initialize a serially accessed memory device makes it suitable for use in many architectures. Many Digital Signal Processors use volatile internal memory for program code storage, and require an external source to initialize this internal memory. Many Field Programmable Gate Arrays use a static RAM architecture and require initialization from an external source. The use of a microprocessor-like device's fetch signals as the clock signal driving a controller's state machine greatly simplifies the circuitry required to interface many types of devices with serially accessed and variable access time memory devices.

The insertion of an external device's initialization commands into instruction fetch bus cycles is particularly useful for initial bootstrap loading of program code for microprocessors which typically wake up from a reset condition with their internal clock speed divided to its slowest rate, and with a maximum number of wait-states selected for its bus cycles.

In one example of a preferred embodiment of the present invention an electrically erasable and reprogrammable serial access non-volatile memory device is coupled to a controller as illustrated in the drawings. When a circuit with these functions is implemented in packages similar to the industry standard packages used by EEPROM devices the resulting devices can be applied as pin-compatible replacement parts for the "boot ROM" EEPROM devices found on most commercially available computer systems. A device of this nature would allow currently available and existing computer systems to expand their non-volatile memory capacity by simply replacing a chip. Manufacturers of BIOS chips can offer these devices as BIOS replacement parts which include a non-volatile disk cache. This would allow a host computer to quickly load sectors of operating system code without having to wait for a disk drive to reach operating speeds. The use of serially accessed memory in this application would be much less expensive than a similar capacity of random access memory, and could greatly speed system initialization after power is applied.

Another implementation of the present invention is in a very inexpensive "network computer" without non-volatile memory. The computer employs a controller according to the teachings of the present invention which keeps a microprocessor in a holding pattern until instructions are available from a network connection. The controller can then allow the microprocessor to execute the instructions directly from the network connection, or it can generate inert no-operation instruction codes for the microprocessor while using the microprocessor's fetch cycles and their generated addresses to load instructions from the network connection into a volatile memory. After the program is loaded the controller issues instructions to cause the microprocessor to begin fetching instructions from the volatile memory.

II. CONCLUSION, RAMIFICATIONS, AND SCOPE OF INVENTION

A potential problem with the insertion of holding pattern instructions must be considered when program code contains multiple element instructions which can potentially be divided across serial memory boundaries. If the processor uses instructions which can include multiple or a variable number of elements the instructions must be stored in the memory such that a single instruction's elements do not span a region of the memory which would cause the controller to generate a holding pattern in between elements of a single instruction. This can usually be accomplished by the insertion of inert single element "no-operation" instruction codes in the program code where necessary to maintain alignment.

The controller's use of an address register for comparison with the requested address allows the microprocessor to execute instructions directly from the controlled serial access memory device without the need for additional memory. This method has the disadvantage of delaying the microprocessor for several bus cycles while the controller is initializing the serial memory device for a non-sequential address request, and when the serial memory device reaches a page boundary; however, this disadvantage can be outweighed by the serial memory's greater density, faster sequential access speed, and lower cost.

In traditional computer architectures general purpose microprocessors are viewed as "master" devices which control signaling on a shared bus. Many commercially available microprocessors employ special purpose signal pins to permit other devices attached to a shared bus to request and receive control of the shared bus. The present invention teaches a method of communication on a shared bus which does not require additional signal pins. Furthermore, the controller allows a variable access time memory to be coupled to the microprocessor without use of a "ready/busy" signal or extensive "wait states".

TABLE I

| INPUTS | | | OUTPUTS/ACTIONS | | |
|---|---|---|---|---|---|
| ADDRESS | STATE | READY | FETCH | NEW STATE | COMMAND/ADDRESS |
| FFFF0000 | X | X | EA (JUMP) | 2 | |
| FFFF0001 | 2 | X | 00 | 2 | |
| FTTF0002 | 2 | X | 00 | 2 | |
| FFFF0003 | 2 | X | 00 | 2 | |
| FFFF0004 | 2 | X | FF | 3 | FF (COMMAND RESET) |
| FF000000 | 3 | X | EA (JUMP) | 3 | |
| FF000001 | 3 | X | 00 | 3 | |
| FF000002 | 3 | X | 00 | 3 | |
| FF000003 | 3 | X | 00 | 3 | |
| FF000004 | 3 | 0 | FF | 3 | |
| FF000004 | 3 | 1 | FF | 2 | |
| FF000000 | 2 | X | EA (JUMP) | 2 | |
| FF000001 | 2 | X | 00 | 2 | |
| FF000002 | 2 | X | 00 | 2 | 0 (COMMAND READ) |
| FF000003 | 2 | X | 00 | 2 | |
| FF000004 | 2 | X | FF | 4 | |
| FF000000 | 4 | X | EA (JUMP) | 4 | |
| FF000001 | 4 | X | 00 | 4 | 0 (ADDRESS 0) |
| FF000002 | 4 | X | 00 | 4 | 0 (ADDRESS 0) |
| FF000003 | 4 | X | 00 | 4 | 0 (ADDRESS 0) |
| FF000004 | 4 | X | FF | 0 | |
| FF000000 | 0 | X | EA (JUMP) | 0 | |
| FF000001 | 0 | X | 00 | 0 | |
| FF000002 | 0 | X | 00 | 0 | |
| FF000003 | 0 | X | 00 | 0 | |
| FF000004 | 0 | 0 | FF | 0 | |
| FF000004 | 0 | 1 | EA | 0 | |

"X" represents "does not matter"

Appendix

```
flashrom.td1(171) : Note: Registered Mode: SYN=0, AC0=1, clk=p1, reg
oe=p13
Fixed Equations from Device FLASHROM
nCE.ck = CLK.i ;
nCE.oe = !x.i ;
CLE.ck = CLK.i ;
CLE.oe = !x.i ;
ALE.ck = CLK.i ;
ALE.oe = !x.i ;
PAL Reduced Equations for Device FLASHROM
D420.oe = 1;
!D420 = A0.i & A14.i & A13.i & A12.i & !nCS.i & !nWE.ifb
   | A1.i & A14.i & A13.i & A12.i & !nCS.i & !nWE.ifb
   | !A2.i & A14.i & A13.i & A12.i & !nCS.i & !nWE.ifb
   | !A14.i & !A13.i & A12.i & !nCS.i & !nWE.ifb
   | RnB.i & A14.i & A13.i & A12.i & !A11.i & !nCS.i & !nWE.ifb &
!ALE.fb & !CLE.fb & !nCE.fb ;
D76531.oe = 1;
D76531 = !A1.i & !A0.i & A14.i & A13.i & A12.i & !nCS.i
   | A2.i & A1.i & !A0.i & A14.i & A13.i & A12.i & !nCS.i ;
nRE.oe = 1;
!nRE = !A12.i & !A11.i & !nCS.i & !nOE.i ;
nCE.d = !A2.i & A14.i & A13.i & A12.i & !A11.i & nCe.fb
   | A1.i & A0.i & !A14.i & A13.i & A12.i
   | A2.i & !A1.i & !A0.i & A14.i & A13.i & A12.i & A11.i
   | A2.i & !A1.i & !A0.i & !RnB.i & A14.i & A13.i & A12.i & nCE.fb ;
!CLE.d = !A13.i & !CLE.fb
   | |A12.i & !CLE.fb
   | A14.i & !A11.i & !CLE.fb
   | !A1.i & !A14.i & A13.i & A12.i
   | A0.i & !A14.i & A13.i & A12.i
   | A2.i & !A1.i & !A0.i & A13.i & A12.i & !A11.i & !ALE.fb &
!nCE.fb ;
ALE.d = !A13.i & ALE.fb
   | !A12.i & ALE.fb
   | A1.i & A14.i & !A11.i & ALE.fb
   | !A2.i & A14.i & !A11.i & ALE.fb
   | A14.i & !A11.i & ALE.fb & nCE.fb
   | !A1.i & A0.i & !A14.i & A13.i & A12.i
   | A2.i & !A1.i & !A0.i & A14.i & A13.i & A12.i & !A11.i & CLE.fb &
```

Appendix-continued

```
!nCE.fb
   | !A1.i & A0.i & !A11.i & ALE.fb ;
nWE.oe = 1;
!nWE = !A12.i & !A11.i & !nCS.i & nDOE_IN.i & nOE.i & !nWR.i
   | A2.i & !A1.i & !A0.i & A14.i & A13.i & A12.i & A11.i & !nCS.i &
nDOE_IN.i & nWR.i
   | !A2.i & A1.i & A14.i & A13.i & A12.i & !A11.i & !nCS.i &
nDOE_IN.i & ALE.fb & !CLE.fb & !nCE.fb & nWR.i
   | A2.i & !A1.i & !A0.i & A14.i & A13.i & A12.i & !nCS.i &
nDOE_IN.i & ALE.fb & !CLE.fb & !nCE.fb & nWR.i
   | !A2.i & !A1.i & !A0.i & A14.i & A13.i & A12.i & !A11.i & !nCS.i &
nDOE_IN.i & !ALE.fb & CLE.fb & !nCE.fb & nWR.i ;
nDOE_OUT.oe = 1;
nDOE_OUT = nOE.i & nWR.i ;
```

| Symbol | Type |
|---|---|
| BYTEff | temp out sig |
| BYTEea | temp out sig |
| BYTE15 | temp out sig |
| BYTE00 | temp out sig |
| READY | temp out sig |
| NAND | temp out sig |
| BUSY | temp out sig |
| STATUS | temp out sig |
| LATCH | temp out sig |
| BOOT | temp out sig |
| RESET | temp out sig |
| AD4 | temp out sig |
| AD3 | temp out sig |
| AD2 | temp out sig |
| AD1 | temp out sig |
| AD0 | temp out sig |
| nWE | io sig |
| nCE | io reg sig |
| ALE | io reg sig |
| CLE | io reg sig |
| nDOE_OUT | io sig |
| D76531 | io sig |
| D420 | io sig |

Appendix-continued

| | |
|---|---|
| nRE | io sig |
| RnB | in sig |
| x | in sig |
| nDOE_IN | in sig |
| nWR | in sig |
| nOE | in sig |
| nCS | in sig |
| A0 | in sig |
| A1 | in sig |
| A2 | in sig |
| A11 | in sig |
| A12 | in sig |
| A13 | in sig |
| A14 | in sig |
| CLK | in sig |
| LO | temp out sig |
| HI | temp out sig |
| GND | power |
| VEE | power |
| VCC | power |

I claim:

1. A method for controlling exchange of signals between a first device and a second device, said method comprising:

receiving a first request signal from said first device and, in response thereto, sending a first command signal to said second device and sending an instance of a first reply signal to said first device, wherein said first reply signal causes said first device to generate an instance of a second request signal, receiving one or more instances of said second request signal and, in response thereto, sending another instance of said first reply signal to said first device, receiving a ready signal from said second device and in response thereto, sending a second command signal to said second device, wherein said second command signal causes said second device to send a second reply to said first device in response to a subsequent instance of said second request signal.

2. A method according to claim 1 wherein said first device is a microprocessor device, said first request signal represents a request to fetch a program instruction, said second device is a serially-accessed variable-access-time memory device, and said second reply represents a program instruction stored in said second device.

3. A method according to claim 1 wherein said first device is a microprocessor device, said first request signal represents a request to fetch a program instruction, said second device is a serially-accessed device, and said second reply represents a program instruction.

4. A method according to claim 1 that further comprises comparing contents of an address register with a fetch address conveyed in said first request signal and, in response to results of said comparing, either sending an instance of said first reply signal or not sending an instance of said first reply signal.

5. A method according to claim 1 wherein said first device comprises internal memory, said first request signal represents a request for information to store in said internal memory, said second device is a serially-accessed variable-access-time memory device, and said second reply represents information to store in said internal memory.

6. A method according to claim 1 wherein said first device generates said first request signal and instances of said second request signals in a first portion of a clock cycle and receives said second reply and instances of said first reply signal in a second portion of said clock cycle.

7. A method according to claim 3 that further comprises comparing contents of an address register with a fetch address conveyed in said first request signal and, in response to results of said comparing, either sending an instance of said first reply signal or not sending an instance of said first reply signal.

8. A method in a state-driven device for controlling exchange of signals between a first device and a second device, said method comprising:

receiving from said first device a request signal representing a request for information from said second device, advancing states of said state-driven device in response to said request signal, sending a command signal to said second device in response to at least one state of said state-driven device, and sending a reply signal to said first device in response to at least one state of said state-driven device.

9. A method according to claim 8 wherein said request signal represents a request to fetch information from a memory address in a set of addresses, and said reply signal causes said first device to send another request signal representing a request to fetch information from a memory address in said set of addresses.

10. A method according to claim 8 wherein said first device is a microprocessor device and said request signal represents a request to fetch a program instruction for execution in said first device.

11. An apparatus for controlling exchange of signals between a first device and a second device, said apparatus comprising:

means for receiving a first request signal from said first device and, in response thereto, sending a first command signal to said second device and sending an instance of a first reply signal to said first device, wherein said first reply signal causes said first device to generate an instance of a second request signal, means for receiving one or more instances of said second request signal and, in response thereto, sending another instance of said first reply signal to said first device, means for receiving a ready signal from said second device and in response thereto, sending a second command signal to said second device, wherein said second command signal causes said second device to send a second reply to said first device in response to a subsequent instance of said second request signal.

12. An apparatus according to claim 11 wherein said first device is a microprocessor device, said first request signal represents a request to fetch a program instruction, said second device is a serially-accessed variable-access-time memory device, and said second reply represents a program instruction stored in said second device.

13. An apparatus according to claim 11 wherein said first device is a microprocessor device, said first request signal represents a request to fetch a program instruction, said second device is a serially-accessed device, and said second reply represents a program instruction.

14. An apparatus according to claim 11 that further comprises means for comparing contents of an address register with a fetch address conveyed in said first request signal and, in response to results of said comparing, for either sending an instance of said first reply signal or not sending an instance of said first reply signal.

15. An apparatus according to claim 11 wherein said first device comprises internal memory, said first request signal represents a request for information to store in said internal memory, said second device is a serially-accessed variableaccess-time memory device, and said second reply represents information to store in said internal memory.

16. An apparatus according to claim 11 wherein said first device generates said first request signal and instances of said second request signals in a first portion of a clock cycle and receives said second reply and instances of said first reply signal in a second portion of said clock cycle.

17. An apparatus according to claim 13 that further comprises means for comparing contents of an address register with a fetch address conveyed in said first request signal and, in response to results of said comparing, for either sending an instance of said first reply signal or not sending an instance of said first reply signal.

18. An apparatus in a state-driven device for controlling exchange of signals between a first device and a second device, said apparatus comprising:

means for receiving from said first device a request signal representing a request for information from said second device, means for advancing states of said state-driven device in response to said request signal, means for sending a command signal to said second device in response to at least one state of said state-driven device, and means for sending a reply signal to said first device in response to at least one state of said state-driven device.

19. An apparatus according to claim 18 wherein said request signal represents a request to fetch information from a memory address in a set of addresses, and said reply signal causes said first device to send another request signal representing a request to fetch information from a memory address in said set of addresses.

20. An apparatus according to claim 18 wherein said first device is a microprocessor device and said request signal represents a request to fetch a program instruction for execution in said first device.

* * * * *